(12) United States Patent
Ishiguro et al.

(10) Patent No.: US 10,502,281 B2
(45) Date of Patent: Dec. 10, 2019

(54) FRICTIONAL POWER TRANSMISSION BELT

(71) Applicant: Mitsuboshi Belting Ltd., Nagata-ku, Kobe-shi, Hyogo (JP)

(72) Inventors: Hisato Ishiguro, Hyogo (JP); Yorifumi Hineno, Hyogo (JP); Masashi Tamura, Hyogo (JP); Hiroki Imai, Hyogo (JP)

(73) Assignee: Mitsuboshi Belting Ltd., Kobe-shi, Hyogo (JP)

( * ) Notice: Subject to any disclaimer, the term of this patent is extended or adjusted under 35 U.S.C. 154(b) by 392 days.

(21) Appl. No.: 14/764,759

(22) PCT Filed: Jan. 30, 2014

(86) PCT No.: PCT/JP2014/052137
§ 371 (c)(1),
(2) Date: Jul. 30, 2015

(87) PCT Pub. No.: WO2014/119671
PCT Pub. Date: Aug. 7, 2014

(65) Prior Publication Data
US 2015/0369335 A1    Dec. 24, 2015

(30) Foreign Application Priority Data

Jan. 30, 2013  (JP) ................. 2013-015169
Jan. 6, 2014  (JP) ................. 2014-000456

(51) Int. Cl.
*F16G 1/08*   (2006.01)
*F16G 5/06*   (2006.01)
(Continued)

(52) U.S. Cl.
CPC ............. *F16G 1/08* (2013.01); *C08K 7/02* (2013.01); *C08L 7/00* (2013.01); *C08L 9/00* (2013.01);
(Continued)

(58) Field of Classification Search
CPC ....... F16G 1/08; F16G 5/06; F16G 5/20; C08K 7/02
See application file for complete search history.

(56) References Cited

U.S. PATENT DOCUMENTS 5,322,479 A * 6/1994 Le Devehat ............ F16G 1/28
474/101
5,626,953 A    5/1997 Fujimoto et al.
(Continued)

FOREIGN PATENT DOCUMENTS

CN    1572830 A    2/2005
EP    0688810 A1   12/1995
(Continued)

OTHER PUBLICATIONS

Apr. 22, 2016—(CN) Notification of First Office Action—App 201480006797.4.
(Continued)

*Primary Examiner* — Michael R Mansen
*Assistant Examiner* — Mark K Buse
(74) *Attorney, Agent, or Firm* — Banner & Witcoff, Ltd.

(57) ABSTRACT

The present invention relates to a frictional power transmission belt containing an extensible layer to form a belt back surface, a compressive layer formed on one surface of the extensible layer and having a power transmission surface at least a part of which can be in contact with pulleys, and a tension member embedded between the extensible layer and the compressive layer along a belt length direction, in which at least the compressive layer is formed of a rubber composition containing a polymer component, short fibers and a surfactant and in which the short fibers contain at least short fibers of water-absorbing fibers.

9 Claims, 2 Drawing Sheets

(51) Int. Cl.
*F16G 5/20* (2006.01)
*C08K 7/02* (2006.01)
*C08L 71/02* (2006.01)
*C08L 7/00* (2006.01)
*C08L 9/00* (2006.01)
*C08L 9/02* (2006.01)
*C08L 9/06* (2006.01)
*C08L 11/00* (2006.01)
*C08L 23/16* (2006.01)

(52) U.S. Cl.
CPC .................... *C08L 9/02* (2013.01); *C08L 9/06* (2013.01); *C08L 11/00* (2013.01); *C08L 23/16* (2013.01); *C08L 71/02* (2013.01); *F16G 5/06* (2013.01); *F16G 5/20* (2013.01); *C08K 2201/004* (2013.01); *C08K 2201/014* (2013.01)

(56) References Cited

U.S. PATENT DOCUMENTS

| | | | |
|---|---|---|---|
| 7,485,060 B2 | 2/2009 | Hineno et al. | |
| 2005/0037882 A1 | 2/2005 | Hineno et al. | |
| 2006/0154770 A1* | 7/2006 | Takaba | F16G 5/20 474/263 |
| 2007/0281814 A1* | 12/2007 | Baldovino | F16G 1/28 474/205 |
| 2009/0227406 A1* | 9/2009 | Wu | C08G 18/12 474/238 |
| 2010/0069190 A1* | 3/2010 | Yoshida | C08L 23/0815 474/265 |
| 2010/0240482 A1* | 9/2010 | Kanzow | F16G 5/08 474/237 |
| 2011/0300981 A1* | 12/2011 | Takahashi | C08K 3/346 474/264 |
| 2016/0298725 A1* | 10/2016 | Ishiguro | F16G 1/28 |

FOREIGN PATENT DOCUMENTS

| | | | |
|---|---|---|---|
| JP | 2001-165244 A | 6/2001 | |
| JP | 2003202055 A | 7/2003 | |
| JP | 2004-125012 A | 4/2004 | |
| JP | 2006-275070 A | 10/2006 | |
| JP | 2006-316812 A | 11/2006 | |
| JP | 2008-185162 A | 8/2008 | |
| JP | 2008-274466 A | 11/2008 | |
| JP | 2009-250293 A | 10/2009 | |
| JP | 2010-276127 A | 12/2010 | |
| JP | 4763626 B2 | 8/2011 | |

OTHER PUBLICATIONS

Apr. 12, 2016—(JP) Final Rejection—App 2014-000456.
Sep. 9, 2016—(EP) Extended European search report—App 14746660.1.
Oct. 25, 2016—(CN) Notification of the Second Office Action—App 201480006797.4.
Nov. 10, 2015—(JP) Notification of Reasons for Refusal—App 2014-000456 drafted Oct. 26, 2015 and dated Nov. 10, 2015.
Mar. 25, 2014—International Search Report—Intl App PCT/JP2014/052137.
May 3, 2017—(CN) Decision of Rejection—App 201480006797.4.
May 29, 2018—(CN) Notification of Reexamination—App 201480006797.4.
Oct. 12, 2018—(CN) Notification of Reexamination—App 201480006797.4.
Mar. 15, 2019—(CN) Decision of Reexamination—App 201480006797.4.

* cited by examiner

[FIG. 1]
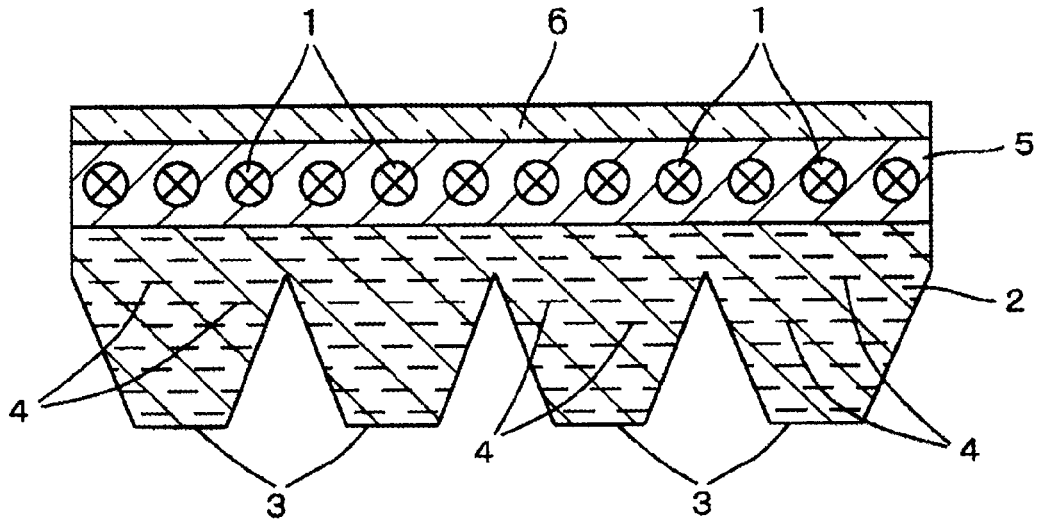
[FIG. 2]
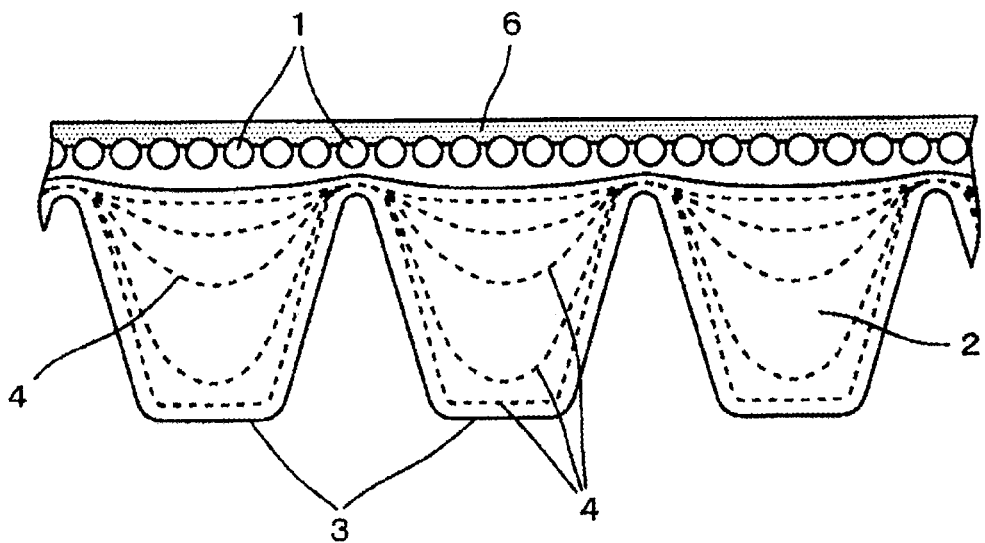
[FIG. 3]
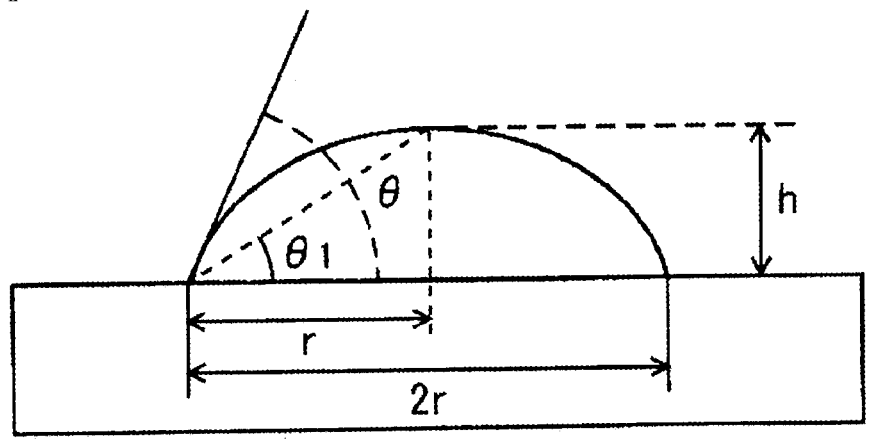

[FIG. 4]
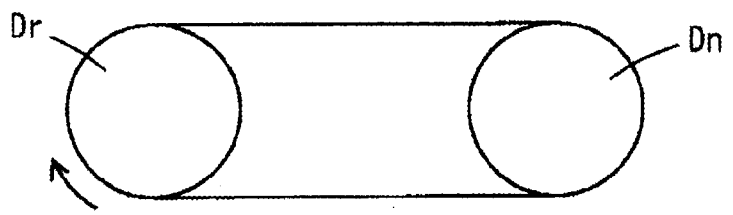
[FIG. 5]
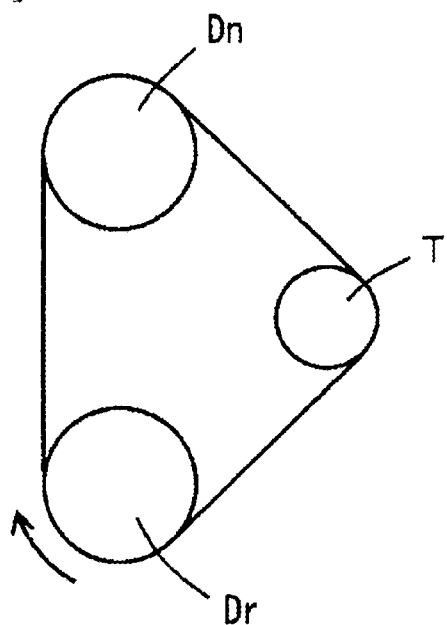
[FIG. 6]
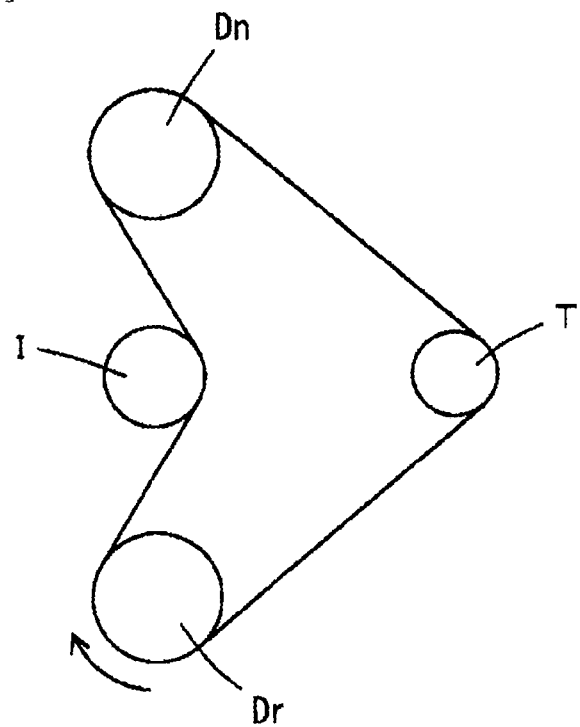

FRICTIONAL POWER TRANSMISSION BELT

CROSS REFERENCE TO RELATED APPLICATIONS

This is a U.S. National Phase Application under 35 U.S.C. § 371 of International Application No. PCT/JP2014/052137, filed Jan. 30, 2014, which claims priority to Japanese Application Nos. 2013-015169 and 2014-000456, filed Jan. 30, 2013 and Jan. 6, 2014, respectively, the entire disclosures of which are incorporated herein by reference.

TECHNICAL FIELD

The present invention relates to a frictional power transmission belt, and in particular, to a frictional power transmission belt satisfying performance of both quietness and fuel efficiency.

BACKGROUND ART

In the field of rubber industry, especially, automobile components are desired to have advanced function and performance. Rubber products for use for such automobile components include frictional power transmission belts and the frictional power transmission belts are widely used, for example, for power transmission for driving auxiliary machine such as automobile air compressors or alternators.

As a belt of the type, there is known a V-ribbed belt that has ribs provided in the belt length direction. As the V-ribbed belt, these days required is a V-ribbed belt that satisfies quietness (noise suppression in dry and in pouring water) or fuel efficiency, especially satisfying both these performances.

Regarding quietness (silentness), for example, Patent Document 1 discloses a power transmission belt in which an ethylene-α-olefin copolymer rubber is used as a base rubber for a compressive layer, carbon black is contained in an amount of at least 50 parts by weight (from 50 to 100 parts by weight) relative to 100 parts by weight of the base rubber, and the carbon black contains large-sized particles of carbon black having an iodine adsorption of at most 40 mg/g, in an amount of at least 30 parts by weight relative to 100 parts by weight of the rubber. The power transmission belt of Patent Document 1 is specialized to the quietness thereof in dry, but nothing is taken into consideration at all relative to the quietness thereof in pouring water, and therefore, there is a drawback of noise generation in pouring water.

Patent Document 2 discloses a frictional power transmission belt of which at least the frictional power transmission surface is formed of a rubber composition that contains a surfactant blended in an amount of from 1 to 25 parts by weight relative to 100 parts by weight of the ethylene-α-olefin elastomer therein. In the frictional power transmission belt of Patent Document 2, the surfactant blended can improve the affinity between the rubber (ethylene-α-olefin elastomer) to form the frictional power transmission surface and water, therefore reducing noise generation owing to friction of misalignment or the like and to thereby improve quietness. However, even if the affinity for water could be improved, a water film would be still constantly formed between the frictional power transmission surface and pulleys, and therefore the belt would still remain to be in a slippery condition and could not be said to be sufficient in point of the quietness and power transmission performance thereof in pouring water.

Patent Document 3 discloses a V-ribbed belt in which a compressive layer contains cotton short fibers and para-aramid short fibers which are formed to protrude from the side of ribs and in which the protruding para-aramid short fibers are made fibrillated. In the V-ribbed belt of Patent Document 3, the cotton short fibers embedded in the compressive layer absorb the water existing between the pulley surface and the compressive rubber surface while, at the same time, the fibrillated para-aramid short fibers sweep away the water existing between the pulley surface and the compressive rubber surface, and in such a way, both the short fibers remove water to thereby prevent minor slips in pouring water. However, cotton short fibers are naturally twisted by themselves and are therefore difficult to disperse in a rubber composition. In particular, when a large amount of such cotton short fibers are blended, there is concern that they would cause dispersion failure, and from such a portion as a starting portion, a crack would occur. In addition, there is concern that such dispersion failure of cotton short fibers would be a factor to generate fluctuation in internal heat generation in the rubber composition (in that the internal heat generation differs between the cotton short fibers-aggregated part and dispersed part), therefore causing another problem of reduction in the fuel efficiency in belt running. To solve these problems, heretofore, there has been employed a method of prolonging the kneading time. For example, as described in Patent Document 4, there is known a method of putting cotton short fibers into a dispersion that contains a surfactant in an amount of from 0.5 to 15% by weight in water, followed by stirring and thereafter dewatering and drying, and blending the resultant fibers into rubber and dispersing them therein. This document discloses that an anionic surfactant is preferred. However, these methods take a lot of time and labor, therefore providing a factor of notably reducing productivity.

Regarding fuel efficiency, for example, Patent Document 5 discloses a V-ribbed belt in which a rubber composition to form a compressive layer contains an ethylene-α-olefin elastomer as a main component and in which the compressive layer has a Tan δ (loss tangent) at 40° C. of less than 0.150 when dynamic viscoelasticity is measured under conditions of an initial strain of 0.1%, a frequency of 10 Hz and a strain of 0.5%. In the V-ribbed belt of Patent Document 5, the compressive layer is formed of the rubber composition in which the ethylene-α-olefin elastomer content ratio is at least 45% by mass and the carbon black content ratio is less than 35% by mass, and consequently, Tan δ at 40° C. can be made low to reduce the internal loss to thereby enhance the fuel efficiency. However, when the polymer fraction is increased, then the friction coefficient at the frictional power transmission surface of the compressive layer tends to increase, therefore causing a risk of stick-slip generation and noise generation (in dry, in pouring water).

As in the above, the frictional power transmission belts of Patent Documents 1 to 3 and 5 could satisfy any one characteristic of quietness and fuel efficiency but could not satisfy both the two performances.

BACKGROUND ART DOCUMENTS

Patent Documents

Patent Document 1: JP-A 2006-316812
Patent Document 2: JP-A 2008-185162
Patent Document 3: JP-A 2001-165244
Patent Document 4: JP-A 2008-274466
Patent Document 5: JP-A 2010-276127

SUMMARY OF THE INVENTION

Problems that the Invention is to Solve

Accordingly, an object of the present invention is to provide a frictional power transmission belt capable of satisfying both performances of quietness (silentness) and fuel efficiency.

Another object of the present invention is to provide a frictional power transmission belt possessing high quietness (silentness) and fuel efficiency, in which short fibers can be efficiently dispersed in a rubber layer even when directly added thereto.

Still another object of the present invention is to provide a frictional power transmission belt capable of improving quietness (silentness), even when the content of the polymer component in a compressive layer is increased (e.g., to be at least 45% by weight).

Another object of the present invention is to provide a frictional power transmission belt having high durability with neither cracking nor ununiform internal heat generation.

Means for Solving the Problems

The present inventors have assiduously studied for the purpose of attaining the above-mentioned objects and, as a result, have found that, when short fibers of water-absorbing fibers and a surfactant are incorporated in a rubber composition to constitute the compressive layer of a frictional power transmission belt, then the quietness in pouring water can be improved by utilizing the water absorbing property of the short fibers and, in addition, the quietness thereof in dry can also be improved by utilizing the action of the surfactant as a lubricant, and have completed the present invention.

Specifically, the frictional power transmission belt of the present invention contains an extensible layer to form a belt back surface, a compressive layer formed on one surface of the extensible layer and having a power transmission surface at least a part of which can be in contact with pulleys, and a tension member embedded between the extensible layer and the compressive layer along a belt length direction, in which at least the compressive layer is formed of a rubber composition containing a polymer component, short fibers and a surfactant and in which the short fibers contain at least short fibers of water-absorbing fibers.

When a surfactant is incorporated in the rubber composition to form the compressive layer as above, then the affinity for water of the compressive layer (e.g., the compressive layer containing an ethylene-α-olefin elastomer as a main polymer component therein) at the frictional power transmission surface thereof can be increased to thereby enhance the quietness in pouring water, and in addition, since the surfactant acts as a lubricant, the friction coefficient of the frictional power transmission surface can be lowered and therefore the quietness in dry can also be improved. In addition, when short fibers of water-absorbing fibers are incorporated in the rubber composition to form the compressive layer, then the short fibers can absorb the water film existing between the frictional power transmission surface and pulleys along pouring water, and therefore the water film can be removed and the belt power transmission performance can be therefore maintained. Further, by combining the surfactant and the short fibers, the dispersibility of the short fibers in the rubber composition can be enhanced, and the dispersion failure of the short fibers can be prevented and the belt durability can be thereby enhanced. Further, owing to the improvement of the dispersibility, the short fibers protruding on the frictional power transmission surface can be uniformly dispersed and the water film spreading on the entire frictional power transmission surface can be removed. Moreover, aggregates (clusters) of short fibers can be reduced to prevent internal heat generation in the rubber composition, and therefore any local fluctuation of internal heat generation can be prevented to thereby improve the fuel efficiency. Furthermore, in the present invention, a surfactant and short fibers are put into rubber and kneaded, and therefore the short fibers can be highly dispersed in the resultant rubber composition and additionally the short fibers can be treated with the surfactant without reducing the productivity. Consequently, in the present invention, even though the short fibers are not pretreated with a surfactant, the productivity of the rubber composition can be improved on the practicable level.

The short fibers may further contain reinforcing fibers. The short fibers of the water-absorbing fibers can contain cellulosic fibers, and the reinforcing fibers may contain at least one type of fibers selected from polyester fibers and polyamide fibers. For example, the short fibers may contain the water-absorbing fibers and the reinforcing fibers in a weight ratio of former/latter of from 10/90 to 50/50. The surfactant may contain a nonionic surfactant (e.g., polyethylene glycol-type nonionic surfactant). The surfactant may have an HLB value of from 8.7 to 17. More concretely, the surfactant may contain a nonionic surfactant selected from polyoxyethylene $C_{10-26}$ alkyl ethers, alkylphenol-ethylene oxide adducts and polyalcohol $C_{10-26}$ fatty acid ester-ethylene oxide adducts, and having an HLB value of from 9 to 15.

Further, the surfactant may have a melting point of 20° C. or lower and a boiling point of 180° C. or higher. When the melting point of the surfactant is 20° C. or lower, then the surfactant is generally liquid, for example, at the belt storage temperature (e.g., 20° C.), and therefore, it may readily bleed in the frictional power transmission surface, differing from a solid one. In addition, the surfactant can readily adhere to at least a part of the surface of the short fibers protruding out from the frictional power transmission surface, and the water absorbability of the short fibers can be thereby enhanced. Further, when the boiling point of the surfactant is 180° C. or higher, the surfactant would not evaporate away during kneading, and therefore the surfactant can penetrate even the monofilaments of twisted short fibers (twisted yarns formed by integrally twisting plural monofilaments) to mix into individual short fibers, and the dispersibility of the short fibers in the rubber composition can be improved more. In addition, when the surfactant having a boiling point higher than the vulcanization temperature in belt production (e.g., 180° C.) is used, the surfactant does not evaporate away from the rubber composition (compressive layer) but can remain therein during vulcanization.

The proportion of the surfactant relative to 100 parts by weight of the polymer component in the rubber composition may be from 0.1 to 12 parts by weight or so relative to 100 parts by weight of the polymer component in the rubber composition, and the proportion of the short fibers of water-absorbing fibers may be from 1 to 20 parts by weight or so relative to 100 parts by weight of the polymer component in the rubber composition. The weight ratio of the short fibers of water-absorbing fibers to the surfactant may be, as the former/latter, from 15/1 to 0.8/1 (e.g., from 10/1 to 1/1) or so, for improving the dispersibility of the short fibers of water-absorbing fibers to thereby improve the fuel efficiency and for further enhancing the quietness in dry and in pouring water.

In the frictional power transmission belt of the present invention, the short fibers of water-absorbing fibers and the surfactant may exist to be exposed out (or to protrude out) to the surface of at least a part of the power transmission surface, and the surfactant may adhere to the surface of at least a part of the exposed short fibers. In this embodiment, the surfactant is adhered to the surface of at least a part of the short fibers protruding out of the frictional power transmission surface, and therefore the hydrophilicity of the short fibers of water-absorbing fibers may be further improved and the water absorbability of the water-absorbing short fibers may be improved more. Consequently, the water film-removing effect of the short fibers of water-absorbing fibers can be improved more and the water film formed can be removed in a short period of time.

Advantageous Effects of the Invention

In the present invention, short fibers of water-absorbing fibers and a surfactant are combined and incorporated in the compressive layer and therefore both characteristics of quietness (silentness) and fuel efficiency can be achieved. In addition, even when the short fibers are directly added to the rubber layer, they can be efficiently dispersed therein and the quietness (silentness) and fuel efficiency of the frictional power transmission belt can be thereby improved. Further, even when the content of the polymer component in the compressive layer is high (e.g., 45% by weight or more), the quietness (silentness) can be improved. Moreover, since the short fibers can be uniformly dispersed, there is no risk of cracking or any ununiform internal heat generation, and the durability of the frictional power transmission belt can be thereby improved.

BRIEF DESCRIPTION OF DRAWINGS

FIG. 1 is a schematic cross-sectional view illustrating one example of a V-ribbed belt of the present invention.
FIG. 2 is a schematic cross-sectional view illustrating another example of a V-ribbed belt of the present invention.
FIG. 3 is a schematic view for explaining a method of measuring the contact angle in Examples.
FIG. 4 is a schematic view for explaining a method of measuring the torque loss in Examples.
FIG. 5 is a schematic view for explaining a misalignment noise generation test in Examples.
FIG. 6 is a schematic view for explaining a high-temperature low-tension bending fatigue test in Examples.

MODE FOR CARRYING OUT THE INVENTION

The frictional power transmission belt of the present invention contains an extensible layer, a compressive layer formed on one surface of the extensible layer, and a tension member embedded between the extensible layer and the compressive layer along the belt length direction, in which the compressive layer has a power transmission surface capable of being in contact with pulleys. The rubber composition to form the compressive layer in the present invention is useful for increasing the power transmission efficiency, and contains short fibers of water-absorbing fibers and a surfactant along with a polymer component therein. As described above, even though a surfactant alone is added to the compressive layer, a water film formed in pouring water is maintained as such so that the quietness and the power transmission efficiency is lowered; and even though water-absorbing fibers alone are added thereto, the dispersibility of the short fibers is still poor so that the fuel efficiency is easily impaired. As opposed to this, when both water-absorbing fibers and a surfactant are used as combined, then the water film formed in pouring water can be efficiently removed and the dispersibility of the short fibers can be enhanced. In particular, the contact efficiency between the water-absorbing fibers and water and the water-absorbing efficiency on the power transmission surface can be enhanced, and therefore the water-absorbing speed of the water-absorbing short fibers can be thereby synergistically improved.

[Compressive Layer]
Polymer Component

Examples of the polymer component include any known rubber component and/or elastomer, for example, dienic rubbers (natural rubbers, isoprene rubbers, butadiene rubbers, chloroprene rubbers, styrene-butadiene rubbers (SBR), acrylonitrile-butadiene rubbers (nitrile rubbers), hydrogenated nitrile rubbers (including mixed polymers of a hydrogenated nitrile rubber and an unsaturated carboxylic acid metal salt), etc.), ethylene-α-olefin elastomers, chlorosulfonated polyethylene rubbers, alkylated chlorosulfonated polyethylene rubbers, epichlorohydrin rubbers, acrylic rubbers, silicone rubbers, urethane rubbers, fluorine rubbers, and the like. These polymer components may be used here either singly or two types or more thereof in combination. Of those polymer components, preferred are ethylene-α-olefin elastomers (ethylene-α-olefin rubbers such as ethylene-propylene rubbers (EPR), ethylene-propylene diene monomers (EDPM, etc.), etc.), from the viewpoint that they do not contain any harmful halogen, they have ozone resistance, heat resistance and cold resistance and they are excellent in economic efficiency.

In the present invention, even though the content of the polymer component in the rubber composition to form the compressive layer is large, quietness (silentness) can be improved. The content of the polymer component in the rubber composition may be, for example, from 40 to 65% by weight (e.g., from 42 to 60% by weight), preferably from 45 to 55% by weight (e.g., from 47 to 53% by weight) or so.

Short Fibers of Water-Absorbing Fibers

Examples of the water-absorbing fibers include vinyl alcohol-based fibers (fibers of polyvinyl alcohol or ethylene-vinyl alcohol copolymer, and vinylon, etc.), cellulosic fibers (cellulose fibers (cellulose fibers derived from plants, animals, bacteria, etc.), fibers of cellulose derivatives), etc. Examples of the cellulose fibers include cellulose fibers derived from natural plants (pulp fibers) such as wood pulp (softwood pulp, hardwood pulp, etc.), bamboo fibers, sugar cane fibers, seed hair fibers (cotton fibers (cotton linter), kapok, etc.), bast fibers (e.g., hemp, kouzo (paper mulberry), mitsumata (oriental paperbush), etc.), leaf fibers (e.g., Manila hemp, New Zealand hemp, etc.), etc.; cellulose fibers derived from animals such as wool, silk, ascidian cellulose, etc.; bacterial cellulose fibers; cellulose of algae, etc. Examples of the fibers of cellulose derivatives include cellulose ester fibers; regenerated cellulose fibers (rayon, etc.), etc.

These fibers may be used here either singly or two types or more thereof in combination. Of those fibers, especially, cellulosic fibers (cellulose fibers such as cotton fibers, etc., cellulose derivative fibers such as rayon, etc.), for example, wood pulp and seed hair fibers (cotton linter, etc.) are preferably contained. The water-absorbing fibers (e.g., cotton fibers) may be added to the polymer component in the form of a woven fabric or nonwoven fabric, for example, as denim, cotton canvas, poplin, corduroy, white cotton, crape, shirting, broad, boil, lawn, etc., or the water-absorbing fibers may be added to the polymer component in the form of a twisted yarn. The water-absorbing fibers may be fibrillated.

The water-absorbing fibers are contained in the compressive layer in the form of short fibers. The mean fiber diameter (number-average fiber diameter) of the water-absorbing fibers can be selected, for example, from a range of from 10 nm to 10 µm (e.g., from 20 nm to 1 µm) or so, and may be generally from 50 nm to 0.7 µm (e.g., from 100 nm to 0.5 µm), preferably from 200 nm to 0.4 µm (e.g., from 200 nm to 0.3 µm) or so. The mean fiber length of the water-absorbing fibers can be selected, for example, from a range of from 100 µm to 30 mm or so, and may be generally from 2 mm to 30 mm, or from 0.1 to 20 mm, preferably from 0.5 to 10 mm, more preferably from 0.7 to 5 mm, and may be from 0.5 to 4 mm (e.g., from 0.7 to 4 mm) or so. Further, the ratio of the mean fiber length to the mean fiber diameter (mean fiber length/mean fiber diameter) (mean aspect ratio) may be, for example, at least 2,000 (e.g., from 2,000 to 100,000), preferably from 5,000 to 50,000, more preferably from 10,000 to 40,000 (e.g., from 20,000 to 35,000) or so.

If desired, the water-absorbing fibers may be combined with any other fibers (reinforcing fibers). Examples of the reinforcing fibers include synthetic fibers such as polyolefin fibers (polyethylene fibers, polypropylene fibers, etc.), polyamide fibers (polyamide 6 fibers, polyamide 66 fibers, polyamide 46 fibers, aramid fibers, etc.), polyester fibers ($C_{2-4}$ alkylene $C_{6-14}$ arylate fibers such as polyethylene terephthalate (PET) fibers, polyethylene naphthalate (PEN) fibers, etc.), polyparaphenylene benzobisoxazole (PBO) fibers, etc.; and inorganic fibers such as carbon fibers, etc. These fibers may be used here either singly or two types or more thereof in combination. As the reinforcing fibers, preferred is use of at least one type of reinforcing fibers selected from polyamide fibers such as aramid fibers, etc., and polyester fibers, etc. The reinforcing fibers may be fibrillated. The reinforcing fibers may also be incorporated in the compressive layer in the form of short fibers, and the mean length of the short fibers may be, for example, from 0.1 to 20 mm, preferably from 0.5 to 15 mm, more preferably from 1 to 10 mm, and may be from 1 to 5 mm (e.g., from 2 to 4 mm) or so.

The weight ratio of the water-absorbing fibers to the reinforcing fibers may be selected from a broad range of, as former/latter, from 5/95 to 70/30, and may be preferably from 10/90 to 50/50, more preferably from 20/80 to 45/55, even more preferably from 30/70 to 40/60 or so.

If desired, these short fibers (short fibers of water-absorbing fibers and reinforcing fibers) may be surface-treated with a surfactant, a silane coupling agent, an epoxy compound, an isocyanate compound or the like, but in the present invention, even though not specifically surface-treated, the short fibers may be uniformly and efficiently dispersed.

The proportion of the short fibers of water-absorbing fibers may be from 1 to 20 parts by weight (e.g., from 5 to 20 parts by weight), preferably from 3 to 17 parts by weight, more preferably from 5 to 15 parts by weight (e.g., from 8 to 12 parts by weight) or so, relative to 100 parts by weight of the polymer component in the rubber composition. When the content of the short fibers is too small, there is concern that then the number of the short fibers protruding out on the frictional power transmission surface would decrease so that the water film-removing effect in pouring water may lower and therefore the quietness and the power transmission performance in pouring water may lower. On the other hand, when the content of the short fibers is too large, then there may occur a risk of fluctuation in internal heat generation owing to dispersion failure of some short fibers, and therefore the fuel efficiency of the belt may lower.

Surfactant

Surfactant is a general term for a substance having, in the molecule thereof, both a hydrophilic group compatible with water and a hydrophobic group (oleophilic group) compatible with oil, and has an action of uniformly mixing a polar substance and a nonpolar substance and, in addition thereto, further has an action of reducing a surface tension of a substance to increase the wettability thereof, or existing between substances, exhibits an action of reducing the friction of the interface therebetween.

The type of the surfactant is not specifically limited, and an ionic surfactant, a nonionic surfactant and the like are usable here. The nonionic surfactant may be a polyethylene glycol-type nonionic surfactant and a polyalcohol-type nonionic surfactant.

The polyethylene glycol-type nonionic surfactant is a nonionic surfactant constructed by adding ethylene oxide to a hydrophobic base component having a hydrophobic group such as a higher alcohol, an alkyl phenol, a higher fatty acid, a polyalcohol higher fatty acid ester, a higher fatty acid amide, a polypropylene glycol or the like, thereby given a hydrophilic group.

Examples of the higher alcohol as the hydrophobic base component include $C_{10-30}$ saturated alcohols such as lauryl alcohol, tetradecyl alcohol, cetyl alcohol, octadecyl alcohol, aralkyl alcohol, etc.; and $C_{10-26}$ unsaturated alcohols such as oleyl alcohol, etc. Examples of the alkylphenol include $C_{4-16}$ alkylphenols such as octylphenol, nonylphenol, etc.

Examples of the higher fatty acid as the hydrophobic base component include saturated fatty acids (e.g., $C_{10-30}$ saturated fatty acids such as myristic acid, palmitic acid, stearic acid, arachic acid, behenic acid, lignoceric acid, cerotic acid, montanic acid, etc., preferably $C_{12-28}$ saturated fatty acids, more preferably $C_{14-26}$ saturated fatty acids, especially preferably $C_{16-22}$ saturated fatty acids, etc.; oxycarboxylic acids such as hydroxystearic acid, etc.), unsaturated fatty acids (e.g., $C_{10-30}$ unsaturated fatty acids such as oleic acid, erucic acid, erucic acid linolic acid, linoleic acid, eleostearic acid, etc.), etc. These higher fatty acids may be used here either singly or two types or more thereof in combination.

The polyalcohol higher fatty acid ester is an ester of a polyalcohol and the above-mentioned higher fatty acid and has an unreacted hydroxyl group. Examples of the polyalcohol include alkanediols ($C_{2-10}$ alkanediols such as ethylene glycol, propylene glycol, butanediol, etc.), alkanetriols (glycerin, trimethylolethane, trimethylolpropane, etc.), alkanetetraols (pentaerythritol, diglycerin, etc.), alkanehexaols (dipentaerythritol, sorbitol, sorbit, etc.), alkaneoctaols (sucrose, etc.), their alkylene oxide adducts ($C_{2-4}$ alkylene oxide adducts), etc.

Hereinafter "oxyethylene", "ethylene oxide" or "ethylene glycol" is expressed by "EO", and "oxypropylene", "propylene oxide" or "propylene glycol" is expressed by "PO". Specific examples of the polyethylene glycol-type nonionic surfactant include poly-EO higher alcohol ethers (poly-EO $C_{10-26}$ alkyl ethers such as poly-EO lauryl ether, poly-EO stearyl ether, etc.), $C_{10-26}$ higher alcohol-EO-PO adducts such as poly-EO poly-PO alkyl ether, etc.; alkylphenol-EO adducts such as poly-EO octylphenyl ether, poly-EO nonylphenyl ether, etc.; fatty acid-EO adducts such as poly-EO monolaurate, poly-EO monooleate, poly-EO monostearate, etc.; glycerin mono- or di-higher fatty acid ester-EO adducts (EO adducts of glycerin mono- or di-$C_{10-26}$ fatty acid esters such as glycerin mono- or di-laurate, glycerin mono- or di-palmitate, glycerin mono- or di-stearate, glycerin mono- or di-oleate, etc.), pentaerythritol higher fatty acid ester-EO adducts (pentaerythritol mono- to tri-$C_{10-26}$ fatty acid ester-EO adducts such as pentaerythritol distearate-EO adduct, etc.), dipentaerythritol higher fatty acid ester-EO adducts, sorbitol higher fatty acid ester-EO adducts, sorbit higher fatty acid ester-EO adducts, sorbitan fatty acid ester-EO adducts such as poly-EO sorbitan monolaurate, poly-EO sorbitan monostearate, poly-EO sorbitan tristearates, etc.; polyalcohol fatty acid ester-EO adducts such as sucrose higher fatty acid ester-EO adducts, etc.; higher alkylamine-EO adducts such as poly-EO laurylaminoether, poly-EO stearylaminoether, etc.; fatty acid amide-EO adducts such as poly-EO coconut fatty acid monoethanolamide, poly-EO lauric acid monoethanolamide, poly-EO stearic acid monoethanolamide, poly-EO oleic acid monoethanolamide, etc.; fat-EO adducts such as poly-EO castor oil, poly-EO hardened castor oil, etc.; poly-PO-EO adducts (poly-EO-poly-PO block copolymers, etc.), etc. These polyethylene glycol-type nonionic surfactants may be used here either singly or two types or more thereof in combination.

The polyalcohol-type nonionic surfactant is a nonionic surfactant constructed by binding a hydrophobic group of a higher fatty acid or the like to the above-mentioned polyalcohol (especially, alkanetriols to alkanehexaols such as glycerol, pentaerythritol, sucrose, sorbitol, etc.). Examples of the polyalcohol-type nonionic surfactant includes glycerin fatty acid esters such as glycerin monostearate, glycerin monooleate, etc.; pentaerythritol fatty acid esters such as pentaerythritol monostearate, pentaerythritol di-tallowate ester, etc.; sorbitan fatty acid esters such as sorbitan monolaurate, sorbitan monostearate, etc.; sorbitol fatty acid esters such as sorbitol monostearate, etc.; sucrose fatty acid esters, polyalcohol alkyl ethers; fatty acid amides of alkanolamines such as coconut fatty acid diethanolamides, etc.; alkylpolyglycosides, etc. These polyalcohol-type nonionic surfactants may also be used here either singly or two types or more thereof in combination, or may be used here as combined with the above-mentioned polyethylene glycol-type nonionic surfactants.

The ionic surfactant includes anionic surfactants such as alkylbenzenesulfonate salts, α-olefinsulfonate salts, long-chain fatty acid salts, alkanesulfonate salts, alkylsulfate salts, poly-EO alkyl ether sulfate ester salts, naphthalene-sulfonic acid/formalin condensates, alkylphosphate salts, etc.; cationic surfactants such as alkyltrimethylammonium salts, dialkyldimethylammonium salts, etc.; ampholytic surfactants such as alkylbetaines, imidazoline derivatives, etc.

Preferred surfactants are nonionic surfactants, especially polyethylene glycol-type nonionic surfactants (e.g., poly-EO $C_{10-26}$ alkyl ethers, alkylphenol-EO adducts, polyalcohol $C_{10-26}$ fatty acid ester-EO adducts, etc.).

The degree of affinity of surfactant to water and oil can be expressed by an HLB (hydrophile-lipophile-balance) value. HLB falls within a range of from 0 to 20, and the value nearer to 0 means higher oleophilicity, and the value nearer to 20 means higher hydrophilicity. In the present invention, the HLB value of the surfactant is preferably from 8.7 to 17 (e.g., from 8.8 to 16) or so, more preferably from 9 to 15 (e.g., from 9 to 14.5), even more preferably from 9.5 to 14 (e.g., from 10 to 13.5) or so. When the HLB value is too small, there is concern that the miscibility between the surfactant and the polymer component (especially EPDM) would be excessively too high so that the surfactant could bleed out little to the frictional power transmission surface and the quietness of the belt would be therefore low. On the other hand, when the HLB value is too high, then there is concern that the miscibility to the polymer component would lower so that the surfactant would too much bleed out to the frictional power transmission surface to lower the friction coefficient of the surface, therefore resulting in the power transmission loss to lower the fuel efficiency. The HLB value as referred to in the present invention is a value calculated according to the Griffin method.

In addition to the HLB value thereof, the boiling point and the melting point of the surfactant would also have a significant influence on the characteristics thereof. The boiling point of the surfactant is preferably higher at normal pressure, and is preferably higher than the rubber kneading temperature or the vulcanization temperature. The boiling point of the surfactant is, for example, preferably 180° C. or higher, more preferably 185° C. or higher, and even more preferably 190° C. or higher. The upper limit of the boiling point of the surfactant is not specifically limited, and may be, for example, 230° C. or lower, or may also be 220° C. or lower, or 215° C. or lower, or 210° C. or lower, and is generally 220° C. or so. The melting point of the surfactant is preferably lower, and is preferably not higher than room temperature. The melting point of the surfactant is, for example, preferably 20° C. or lower, more preferably 15° C. or lower, even more preferably 10° C. or lower, still more preferably 5° C. or lower, further more preferably 0° C. or lower, and especially preferably −5° C. or lower. The surfactant is generally liquid at room temperature (20 to 25° C.). The lower limit of the melting point of the surfactant is not specifically limited, and may be, for example, −35° C. or higher, or may be −30° C. or higher. When the boiling point of the surfactant is lower than the rubber kneading temperature or the vulcanization temperature, then there is concern that the surfactant would evaporate away during rubber kneading or vulcanization so that the dispersibility of the short fibers would be insufficient and the fuel efficiency would lower, and in addition, since the surfactant could bleed out little to the frictional power transmission surface, the quietness would lower. On the other hand, when the melting point of the surfactant is higher than room temperature, then the surfactant would be solid at room temperature and therefore the surfactant could not suitably bleed out to the frictional power transmission surface and the therefore quietness in dry and in pouring water would lower.

The surfactant is, as kneaded in rubber, effective for treating the short fibers while dispersing them. Especially effective surfactants are the surfactants having the above-mentioned specific HLB value, melting point and/or boiling point.

The content of the surfactant is preferably from 0.1 to 12 parts by weight (e.g., from 0.1 to 10 parts by weight), more preferably from 0.5 to 10 parts by weight (e.g., 1 to 10 parts by weight), even more preferably from 2 to 8 parts by weight (e.g., from 3 to 7 parts by weight) or so, relative to 100 parts by weight of the polymer component in the rubber composition. When the content of the surfactant is too small, then there is concern that along with the dispersibility of the short fibers, the fuel efficiency may lower and in addition, the quietness (in dry, in pouring water) may also be insufficient. On the other hand, when the content of the surfactant is too large, then there is concern that the surfactant would excessively bleed out to the frictional power transmission surface to greatly lower the friction coefficient whereby the fuel efficiency may lower (caused by power transmission loss but not by internal heat generation) and the frictional power transmission surface of the belt would slip to rub excessively against pulleys therefore resulting in increase in the abrasion of the frictional power transmission surface (reduction in abrasion resistance).

The weight ratio of the short fibers of water-absorbing fibers to the surfactant can be selected within a range within which the dispersibility of the short fibers of water-absorbing fibers can be increased and the fuel efficiency can be thereby increased and the quietness in dry and in pouring water can be increased more, and may be, for example, as the ratio of the former/latter, from 15/1 to 0.8/1 (e.g., from 12/1 to 0.9/1), preferably from 10/1 to 1/1 (e.g., from 8/1 to 2/1) or so.

The weight ratio of the surfactant to the whole short fibers may be, as the ratio of the former/latter, from 1/1 to 50/1, preferably from 2/1 to 40/1, more preferably from 3/1 to 30/1 (e.g., from 5/1 to 25/1) or so.

Additive or Compounding Agent

If desired, the rubber composition may contain any known additive or compounding agent. Examples of the compounding agent includes vulcanizing agents or cross-linking agents (e.g., oximes (quinone dioxime, etc.), guanidines (diphenylguanidine, etc.), metal oxides (magnesium oxide, zinc oxide, etc.), organic peroxides (diacyl peroxides, peroxy esters, dialkyl peroxides, etc.), etc.), vulcanization aids, vulcanization accelerators, vulcanization retardants, strengthening agents (carbon black, silicon oxide such as silica hydrate, etc.), metal oxides (e.g., zinc oxide, magnesium oxide, calcium oxide, barium oxide, iron oxide, copper oxide, titanium oxide, aluminium oxide, etc.), fillers (clay, calcium carbonate, talc, mica, etc.), plasticizers, softening agents (oils such as paraffin oil, naphthenic oil, etc.), processing agents or processing aids (stearic acid, metal stearates, wax, paraffin, etc.), antiaging agents (aromatic amines, benzimidazole-type antiaging agent, etc.), adhesiveness improvers (resorcinol-formaldehyde co-condensate, melamine resin such as hexamethoxymethylmelamine, etc., their co-condensates (resorcin-melamine-formaldehyde co-condensate, etc.), etc.), colorants, tackifiers, coupling agents (silane coupling agent, etc.), stabilizers (antioxidants, UV absorbents, heat stabilizers, etc.), lubricants, flame retardants, antistatic agents, etc. These compounding agents may be used here either alone or as combined, and may be suitably selected depending on the type, the use and the performance of the polymer component.

As the carbon black, preferably contained is carbon black having a large particle size, especially a large-size carbon black having an iodine absorption amount of at most 40 mg/g, for reducing the internal heat generation of the rubber composition to form the compressive layer and to thereby improve the fuel efficiency. Examples of the large-size carbon black include FEF, GPF, APF, SRF-LM, SRF-HM, etc. These carbon blacks may be used here either singly or as combined. The mean particle diameter of the large-size carbon black is, for example, from 40 to 200 nm, preferably from 45 to 150 nm, more preferably from 50 to 125 nm or so.

The large-size carbon black has a small reinforcing effect and is poor in abrasion resistance, and is therefore preferred to be used in combination with a small-size carbon black (of which the iodine absorption amount is higher than 40 mg/g) having a small particle size and having a high reinforcing effect. Using at least two types of carbon blacks differing in the particle size could satisfy both fuel efficiency (owing to the effect of the large-size carbon black) and abrasion resistance (owing to the effect of the small-size carbon black). Examples of the small-size carbon black include SAF, ISAF-HM, ISAF-LM, HAF-LS, HAF, HAF-HS, etc.

These carbon blacks may be used here either singly or as combined. The mean particle size of the small-size carbon black may be less than 40 nm, for example, from 5 to 38 nm, preferably from 10 to 35 nm, more preferably from 15 to 30 nm or so. The ratio of the mean particle size of the large-size carbon black to the mean particle size of the small-size carbon black may be, as former/latter, from 1.5/1 to 3/1, preferably from 1.7/1 to 2.7/1, more preferably from 1.8/1 to 2.5/1 or so.

The amount of the carbon black to be used is at least 40 parts by weight (e.g., from 45 to 100 parts by weight, preferably from 50 to 80 parts by weight, more preferably from 50 to 70 parts by weight, even more preferably from 55 to 65 parts by weight or so) relative to 100 parts by weight of the polymer component. The weight ratio of the large-size carbon black to the small-size carbon black may be within a range capable of satisfying both fuel efficiency and abrasion resistance and may be, for example, as former/latter, from 20/80 to 55/45, preferably from 25/75 to 50/50, more preferably from 30/70 to 50/50 or so. Of the carbon black, when the proportion of the small-size carbon black is too large, then the internal heat generation (Tan $\delta$) of the rubber composition (compressive layer) would be large and the fuel efficiency would lower; but when the large-size carbon black is too much, the abrasion resistance would reduce owing to under-reinforcement.

Tan $\delta$

Tan $\delta$ is one calculated by dividing loss elastic modulus (E") by storage elastic modulus (E'), and is expressed as a ratio of the (loss) energy to be lost as heat during one oscillation cycle to the maximum energy to be stored therein, and this is an index of energy loss. That is, Tan $\delta$ enables numerical expression of the index of the loss as heat of the oscillation energy given to the rubber composition. Accordingly, a smaller value of Tan $\delta$ means that the heat to be lost is small (or that is, the internal heat generation is small and the fuel efficiency is enhanced). In one preferred embodiment of the present invention, Tan $\delta$ at an ordinary belt running temperature (e.g., in a temperature range of from 40 to 120° C.) is focused on, and this Tan $\delta$ is set to be low. Concretely, for example, tan $\delta$ of the compressive layer at 40° C. and at a frequency of 10 Hz is selected from a range of from 0.130 to 0.155 or so for improving the fuel efficiency, and may be, in general, from 0.14 to 0.15 (e.g., from 0.140 to 0.147) or so.

Structure of Frictional Power Transmission Belt

The frictional power transmission belt of the present invention contains an extensible layer to form an outer peripheral surface, a compressive layer formed on one surface of the extensible layer to form an inner periphery, and a tension member embedded between the extensible layer and the compressive layer along the belt length direction, in which the extensible layer forms a belt back surface, and at least a part of the compressive layer has a power transmission surface capable of being in contact with pulleys. Further, the frictional power transmission belt of the present invention may additionally have an adhesive rubber layer (adhesive layer) existing between the extensible layer and the compressive layer, and the tension member may be embedded in the adhesive rubber layer.

The type of the frictional power transmission belt is not specifically limited, and examples thereof include V-belts [raw-edge belts (a raw-edge belt of which the cross section has a V-shaped profile, etc.), raw-edge cogged belts (a raw-edge cogged belt having cogs formed on the inner peripheral side or on both the inner peripheral side and the outer peripheral side of a raw-edge belt)], V-ribbed belts, flat belts, etc. Of those, preferred is a V-ribbed belt having a high power transmission efficiency.

The configuration of the V-ribbed belt is not specifically limited. For example, there is exemplified the configuration illustrated in FIG. 1. FIG. 1 is a schematic cross-sectional view illustrating one example of the frictional power transmission belt of the present invention. This configuration contains, as formed from the belt lower surface (inner peripheral surface) toward the belt upper surface (back surface) and laminated in that order, a compressive layer 2, an adhesive layer 5 with tension members 1 embedded in the belt length direction, and an extensible layer 6 formed of a cover canvas (woven fabric, knitted fabric, nonwoven fabric, etc.), in which short fibers 4 are embedded in the compressive layer 2 as oriented therein mainly in the belt width direction. The compressive layer 2 is formed to have plural grooves each having a V-shaped cross section and extending in the belt length direction, and between the grooves, formed are plural ribs 3 each having a V-shaped cross section (inverted trapezoid) (in the example illustrated in FIG. 1, four ribs). The two slope faces (surfaces) of the rib 3 form frictional power transmission surfaces, and come in contact with pulleys to transmit power thereto (frictional power transmission).

The frictional power transmission belt of the present invention is not limited to the above embodiment, so far as it contains an extensible layer, a compressive layer and a tension member embedded therebetween along the belt length direction. For example, the extensible layer 6 may be formed of a rubber composition, and a tension member 1 may be embedded between the extensible layer 6 and the compressive layer 2 without providing the adhesive layer 5. Further, in another embodiment, the adhesive layer 5 may be provided on at least any one of the compressive layer 2 or the extensible layer 6, and the tension member 1 may be embedded between the adhesive layer 5 (on the side of the compressive layer 2) and the extensible layer 6, or between the adhesive layer 5 (on the side of the extensible layer 6) and the compressive layer 2. Also, in another embodiment, powdery fibers (e.g., cotton, nylon, aramid, etc.) may be implanted in the surface of the ribs 3 (especially on the frictional power transmission surface), or a lubricant may be sprayed thereonto.

As illustrated in FIG. 2, short fibers 4 may be incorporated in the rubber composition to form the compressive layer 2, and the short fibers 4 may be aligned therein so as to be in a flow state along the shape of the cross section of each rib therein (in the vicinity of the surface of each rib, the short fibers 4 are in a state aligned along the profile of the rib 3). In this embodiment, the tension member is embedded in the adhesive layer on the side of the extensible layer 6.

Incidentally, at least the compressive layer may be formed of the above-mentioned rubber composition, and the extensible layer and the adhesive layer do not have to be formed of the rubber composition of the compressive layer. The rubber composition to form the extensible layer and the adhesive layer do not have to contain the above-mentioned short fibers and/or surfactant.

For the tension member, widely used are high-modulus fibers, for example, synthetic fibers such as the above-mentioned polyester fibers (polyalkylene arylate fibers), aramid fibers, etc., and inorganic fibers such as carbon fibers, etc. Preferred are polyester fibers (polyethylene terephthalate fibers, ethylene naphthalate fibers), and aramid fibers. The fibers may be multifilament yarns, for example, multifilament yarns having a fineness of from 2,000 to 10,000 denier (especially from 4,000 to 8,000 denier) or so.

As the tension member, in general, use can be made of a twisted cord formed of multifilament yarns (e.g., double-twist, single-twist or Lang's lay). The mean wire diameter of the tension member (fiber diameter of twisted cord) may be, for example, from 0.5 to 3 mm, preferably from 0.6 to 2 mm, more preferably from 0.7 to 1.5 mm or so. The tension member is embedded in the length direction of the belt, and one or more tension members may be embedded in parallel at a predetermined pitch parallel to the length direction of the belt.

For improving the adhesiveness thereof to the polymer component, the tension member may be subjected to adhesion treatment in a variety of ways with an epoxy compound, an isocyanate compound or the like, like the above-mentioned short fibers, and then may be embedded between the extensible layer and the compressive layer (especially in the adhesive layer).

Further, the extensible layer may have a reinforcing fabric, for example, a fabric material of a woven fabric, a wide-angle canvas fabric, a knitted fabric, a nonwoven fabric or the like (preferably a woven fabric). If desired, the reinforcing fabric may be subjected to the above-mentioned adhesion treatment, and may be laminated on the surface of the extensible rubber layer.

Surface Configuration of Power Transmission Surface of Compressive Layer

The power transmission surface of the compressive layer may be flat, but preferably, in at least the surface of the power transmission surface (in the above-mentioned V-ribbed belt, both sides (or the inclined parts) of the ribs), at least the short fibers of water-absorbing fibers are exposed out or exist (preferably protruding out as a form of raised fabric). Also preferably, in the surface of the power transmission surface, the surfactant is exposed out to exist, as bleeding out therein. The short fibers and the surfactant may exist on the surface in at least a part of the power transmission surface capable of being in contact with pulleys (the contact surface with pulleys or the power transmission surface to be in contact with pulleys), or may exist in the entire inner peripheral surface of the compressive layer, and as described above, they may exist in the whole extent of the ribs including the top of each rib, not limited to both sides of the cross section of the ribs extending in the length direction.

Further, the surfactant preferably adheres to the short fibers for further improving the water absorbability of the short fibers. The surfactant may adhere to, for example, the surface of at least a part of the short fibers kept exposed out on the surface in the power transmission surface (e.g., the base part, the halfway part or the tip part of the raised short fibers, or the entire part of the raised short fibers).

If desired, the short fibers may be exposed out on the power transmission surface by polishing or grinding the power transmission surface, and the surfactant may be kept bleeding out on the surface of the power transmission surface by bleeding out. If desired, the surfactant may be made to exist in the power transmission surface or to adhere to the short fibers by applying it thereto.

[Belt Production Method]

The production method for the frictional power transmission belt is not particularly limited, and employable is any known or conventional method. For example, a compressive layer, an adhesive layer with a tension member embedded therein, and an extensible layer are separately formed of an unvulcanized rubber composition and laminated, and the resultant laminate is formed into a cylinder using a mold, then vulcanized to give a sleeve, and cutting the vulcanized sleeve to have a predetermined width. To be specific, a V-ribbed belt can be produced according to the methods mentioned below.

(First Production Method)

First, a sheet for extensible layer is wound around a cylindrical molding tool having a smooth surface, then a tension member (processed rope or the like) is spirally spun around the sheet, and further a sheet for adhesive layer and a sheet for compressive layer are wound sequentially thereover to prepare a shaped body. Subsequently, a vulcanization jacket is put over the shaped body, the mold (molding tool) is set in a vulcanizer, and vulcanization is conducted under a predetermined vulcanization condition. Then, demolded from the molding tool, a cylindrical vulcanized rubber sleeve is obtained. The outer surface (compressive layer) of the vulcanized rubber sleeve is polished with a polishing wheel to form plural ribs, and then the vulcanized rubber sleeve is cut with a cutter in a predetermined width in the belt length direction to finish into a V-ribbed belt. The cut belt is turned over to give a V-ribbed belt of which the compressive layer has ribs on the inner peripheral surface thereof.

(Second Production Method)

First, used as an inner mold is a cylindrical inner mold equipped with a flexible jacket on the outer peripheral surface thereof. An unvulcanized sheet for extensible layer is wound around the flexible jacket on the outer peripheral surface, and a tension member is spirally spun around the sheet, and further an unvulcanized sheet for compressive layer is wound therearound to prepare a laminate. Next, used as an outer mold attachable to the inner mold is a cylindrical outer mold having plural rib frames formed on the inner peripheral surface thereof. In the outer mold is concentrically placed the inner mold wrapped with the laminate. Subsequently, the flexible jacket is expanded toward the inner peripheral surface (rib frames) of the outer mold so as to press the rib frames against the laminate (compressive layer) and vulcanize the laminate. With that, the inner mold was removed from the outer mold, and the vulcanized rubber sleeve having plural ribs are removed from the outer mold, and then using a cutter, the vulcanized rubber sleeve is cut into a predetermined width in the belt length direction to finish into a V-ribbed belt. In the second production method, the laminate including the extensible layer, the tension member and the compressive layer can be expanded all at one time to finish into a sleeve (or a V-ribbed belt) having plural ribs.

(Third Production Method)

Relative to the second production method, for example, also employable here is the method disclosed in JP-A 2004-82702 (method in which only the compressive layer is expanded to give a pre-molded body (in a semi-vulcanized state), and then the extensible layer and the tension member are expanded to bond them to the pre-molded body in a mode of integral vulcanization to finish into a V-ribbed belt).

Of those production methods, preferred is the first production method in which the compressive layer is polished so as to make the short fibers sufficiently protrude out on the frictional power transmission surface. In the second and third production methods, the compression layer is pressed against the rib frames to form the ribs, and therefore in these methods, the protrusion amount of the short fibers would be small. Accordingly, the power transmission surface of the compressive layer formed according to these methods may be polished or ground to make the short fibers protrude out. In addition, short fibers may be implanted on the compressive layer to form an implanted short fibers layer. However, when the implantation method alone is employed, the protrusion amount (raising amount) of short fibers is still small since many of the short fibers are taken inside the compressive layer (or taken in the inside area around the frictional power transmission surface) owing to the flow of rubber (compressive layer) in pressurization.

Examples

Hereinunder the present invention is described in more detail based on Examples thereof, but the present invention is not whatsoever restricted by these Examples.

Rubber Composition

The rubber compositions shown in Table 1 were rubber-kneaded with a Banbury mixer, and the kneaded rubbers were rolled with a calender roll to give respective unvulcanized rolled rubber sheets (sheets for compressive layer) having a predetermined thickness. In addition, using the same rubber compositions as in Table 1 but not containing the nylon short fibers, the cotton short fibers and the surfactant, sheets for adhesive layer and sheets for extensible layer were prepared in the same manner as above.

The proportion of each component in the rubber composition shown in Table 1 is in terms of part by mass. The components in the rubber composition are as mentioned below.

EPDM: Manufactured by Mitsui Chemical, "EPT2060M"
Nylon short fibers: 66 nylon, mean fiber diameter 27 µm, mean fiber length 3 mm
Cotton short fibers: denim, mean fiber diameter 13 µm, mean fiber length 6 mm
Antiaging agent 1: diphenylamine-type antiaging agent (manufactured by Ouchi Shinko Chemical Industry "Noclac CD")
Antiaging agent 2: mercaptobenzimidazole-type antiaging agent (manufactured by Ouchi Shinko Chemical Industry "Noclac MB")
Carbon black HAF: Manufactured by Tokai Carbon "Sheast 3", mean particle size 28 nm
Carbon black GPF: Manufactured by Tokai Carbon "Sheast V", mean particle size 62 nm
Organic peroxide: dicumyl peroxide
Dibenzoyl/quinone dioxime: Manufactured by Ouchi Shinko Chemical Industry "Vulnoc DMG"

As surfactants, the following polyoxyalkylene alkyl ethers were used.
Surfactant 1: "Newcol 2308-LY", HLB value 12.3, boiling point 193° C., melting point −7° C.
Surfactant 2: "Newcol 2303-Y", HLB value 9.1, boiling point 182° C., melting point −28° C.
Surfactant 3: "Newcol 2308-Y", HLB value 14.2, boiling point 201° C., melting point 10° C.

Belt Production Method

Belts were produced according to the above-mentioned first production method. Concretely, first, a sheet for extensible layer was wound around a cylindrical molding tool having a smooth surface, then a processed rope was spirally spun around the sheet for extensible layer, and further a sheet for adhesive layer and a sheet for compressive layer were wound sequentially thereover to prepare a shaped body. Subsequently, a vulcanization jacket was put over the shaped body and the mold was set in a vulcanizer and vulcanization was conducted under a predetermined vulcanization condition. Then, demolded from the molding tool, a cylindrical vulcanized rubber sleeve was obtained. The outer surface (compressive layer) of the vulcanized rubber sleeve was polished with a polishing wheel to form plural ribs at predetermined intervals, and then the vulcanized rubber sleeve was cut with a cutter in a predetermined width in the belt length direction to finish into a V-ribbed belt, in which the number of ribs in the width direction was 6 and which had a circumferential length of 1100 mm.

Measurement of Physical Properties of Belt (a) Measurement of Viscoelasticity (Tan δ)

The rib part of the V-ribbed belt was sliced with a slicer to take off one rib to be a test piece (in which the short fibers aligned in the rib width direction). The test piece has a nearly trapezoidal cross-section (top side 2.3 mm, bottom side 1.6 mm, height 2.0 mm) and has a length of 40 mm. The test piece was fixed to the chuck of a viscoelastometer (manufactured by Ueshima Seisakusho "VR-7121") in which the chuck-to-chuck distance was 15 mm, and an initial strain (static strain) of 2.0% was given thereto. At a frequency of 10 Hz and a dynamic strain of 1.0% (that is, while a strain of ±1.0% was given thereto in the length direction based on the 2.0% initial strain as the center position or the reference position), and at a heating rate of 1° C./min, Tan δ (loss tangent) at 40° C. was measured.

(b) Measurement of Contact Angle

The contact angle θ between the frictional power transmission surface of the belt and water (the angle between the tangent line to a water drop and the frictional power transmission surface) can be calculated from the following equations using the θ/2 method on a projected picture of a water drop of water dropped to the frictional power transmission surface, as illustrated in FIG. 3.

$$\theta = 2\theta_1 \quad (1)$$

$$\tan \theta_1 = h/r \rightarrow \theta_1 = \tan^{-1}(h/r) \quad (2)$$

(In the formulae, $\theta_1$ means the angle between the linear line to run from the edge point of the water drop (in FIG. 3, the left edge point) to the top thereof, and the frictional power transmission surface, h means the height of the water drop, and r means the radius of the water drop.)

The formula (2) is introduced into the formula (1) to give the following formula (3).

$$\theta = 2 \tan^{-1}(h/r) \quad (3)$$

For measurement of the contact angle, r and h were measured on the projected picture of the water drop dropped by using an automatic contact angle meter (manufactured by Kyowa Interface Science CA-W Model), and the angle was computed based on the formula (3). The contact angle was measured immediately after water drop application (after 1 second). A smaller contact angle θ means more excellent in the affinity between the frictional power transmission surface and water, and it was determined that a contact angle θ of 70° or less means excellent in wettability.

(c) Torque Loss Measurement

As illustrated in FIG. 4, the V-ribbed belt was hooked over a biaxial running tester that consisted of a drive (Dr) pulley having a diameter of 55 mm and a driven (Dn) pulley having a diameter of 55 mm, and a predetermined initial tension was given to the V-ribbed belt within a tension range of from 450 to 950 N/belt. With no load given to the driven pulley, the drive pulley was rotated at 2,000 rpm and the difference between the driving torque and the driven torque was calculated as a torque loss. The torque loss determined in this measurement would include the torque loss caused by the bearing of the tester, in addition to the torque loss caused by the V-ribbed belt. Consequently, a metal belt (material: maraging steel) of which the torque loss as a belt could be considered to be substantially 0 (zero) was previously run, and the difference between the driving torque and the driven torque was referred to as the torque loss caused by the bearing (bearing loss). The torque loss caused by the bearing (bearing loss) was subtracted from the torque loss calculated in running the V-ribbed belt (the torque loss caused by both of the belt and the bearing), and the resultant value was referred to as the torque loss caused by the belt alone. The above-mentioned torque loss (bearing loss) is the torque loss in the case where the metal belt is run under a predetermined initial tension (e.g., in a case where the V-ribbed belt was run under an initial tension of 500 N/belt, the torque loss in the case where the metal belt was run under that initial tension shall be the bearing loss). The V-ribbed belt having a smaller torque loss means more excellent in fuel efficiency, and it was determined that a torque loss of 0.37 Nm or less means to be good in fuel efficiency.

(d) Misalignment Noise Generation Test

As illustrated in FIG. 5, the V-ribbed belt was hooked over each pulley in a triaxial running tester that consisted of a drive (Dr) pulley having a diameter of 125 mm, a driven (Dn) pulley having a diameter of 125 mm, and a tension (T) pulley having a diameter of 60 mm, in which the axial distance between the drive pulley and the driven pulley is 212 mm, in such a manner that the winding angle on the tension pulley could be 90°, and the driven pulley was displaced in the pulley axial direction relative to the other pulleys (drive pulley, tension pulley) for misalignment control at a predetermined angle. With that, a load was applied to the drive pulley so that the belt tension could be 6 kgf/rib, and the rotation number of the drive pulley was made to be 1,000 rpm. While water was applied (200 cc) between the drive pulley and the driven pulley at room temperature, the angle (noise generation limit angle) at which noise would occur when the belt was run in misalignment was determined. A larger value of noise generation limit angle means excellent in quietness, and it was determined that an angle of 2.2° or more means to be good in quietness.

(e) TS Wear Test

The V-ribbed belt was wound around a guide roller (diameter 60 mm) at a winding angle of the V-ribbed belt of 90 degrees, and one end of the V-ribbed belt was fixed while a weight of 1.75 kgf/3 ribs was hung down from the other end thereof. The guide roller was rotated at 43 rpm, and the values of the load cell were read. The tension T1 on the tension side and the tension T2 on the release side were thus read, and from the tension ratio (T1/T2), the friction coefficient $\mu = (1/2\pi) \ln(T1/T2)$ was calculated. The friction coefficient was evaluated in dry (DRY) and in pouring water at 60 cc/min (WET).

(f) High-Temperature Low-Tension Bending Fatigue Test

As illustrated in FIG. 6, the V-ribbed belt was hooked over each pulley in a tester that consisted of, as arranged in that order, a drive pulley (Dr, diameter 120 mm), an idler pulley (I, diameter 85 mm), a driven pulley (Dn, diameter 120 mm), and a tension pulley (T, diameter 45 mm). The winding angle of the V-ribbed belt around the tension pulley was 90 degree, and the winding angle thereof around the idler pulley was 120 degrees. In an ambient temperature of 120° C., the V-ribbed belt was driven by applying a load to the drive pulley under the test condition that the rotation number of the drive pulley could be 4,900 rpm and the belt tension could be 40 kgf/3 ribs, and the driven pulley was run while given a load of 12 PS. The running time was 400 hours, and the time that elapsed before generation of 6 cracks each running to reach the tension member was checked.

The results are shown in Table 1.

TABLE 1

| Material | Ex. 1 | Ex. 2 | Ex. 3 | Ex. 4 | Ex. 5 | Ex. 6 | Ex. 7 | Ex. 8 | Comp. Ex. 1 | Comp. Ex. 2 |
|---|---|---|---|---|---|---|---|---|---|---|
| EPDM | 100 | 100 | 100 | 100 | 100 | 100 | 100 | 100 | 100 | 100 |
| Nylon Short Fibers | 20 | 20 | 20 | 20 | 20 | 20 | 20 | 20 | 20 | 20 |
| Cotton Short Fibers | 10 | 10 | 10 | 10 | 10 | 5 | 15 | 20 | 10 | 0 |
| Zinc Oxide | 5 | 5 | 5 | 5 | 5 | 5 | 5 | 5 | 5 | 5 |
| Stearic Acid | 1 | 1 | 1 | 1 | 1 | 1 | 1 | 1 | 1 | 1 |
| Antiaging Agent 1 | 1 | 1 | 1 | 1 | 1 | 1 | 1 | 1 | 1 | 1 |
| Antiaging Agent 2 | 1 | 1 | 1 | 1 | 1 | 1 | 1 | 1 | 1 | 1 |
| Carbon Black HAF | 30 | 30 | 30 | 30 | 30 | 30 | 30 | 30 | 30 | 30 |
| Carbon Black GPF | 30 | 30 | 30 | 30 | 30 | 30 | 30 | 30 | 30 | 30 |
| Paraffin Oil | 5 | 5 | 5 | 5 | 5 | 5 | 5 | 5 | 15 | 5 |
| Surfactant 1 | 1 | 5 | 10 | 0 | 0 | 5 | 5 | 5 | 0 | 5 |
| Surfactant 2 | 0 | 0 | 0 | 5 | 0 | 0 | 0 | 0 | 0 | 0 |
| Surfactant 3 | 0 | 0 | 0 | 0 | 5 | 0 | 0 | 0 | 0 | 0 |
| Organic Peroxide | 4 | 4 | 4 | 4 | 4 | 4 | 4 | 4 | 4 | 4 |
| Dibenzoyl/Quinone Dioxime | 2 | 2 | 2 | 2 | 2 | 2 | 2 | 2 | 2 | 2 |
| Total | 210 | 214 | 219 | 214 | 214 | 209 | 219 | 224 | 219 | 204 |
| Weight Ratio (water-absorbing fibers/reinforcing fibers) | 33/67 | 33/67 | 33/67 | 33/67 | 33/67 | 20/80 | 43/57 | 50/50 | 33/67 | — |
| Weight Ratio (water-absorbing fibers/surfactant) | 10/1 | 2/1 | 1/1 | 2/1 | 2/1 | 1/1 | 3/1 | 4/1 | — | — |
| Loss Tangent at 40° C. (tan δ) | 0.141 | 0.143 | 0.146 | 0.144 | 0.140 | 0.140 | 0.149 | 0.155 | 0.161 | 0.142 |
| Contact Angle (°) between Frictional Power Transmission Surface and Water | 64 | 31 | 13 | 42 | 26 | 55 | 17 | 12 | 113 | 75 |
| Power Transmission Loss (Nm) | 0.32 | 0.34 | 0.37 | 0.34 | 0.33 | 0.33 | 0.36 | 0.37 | 0.38 | 0.33 |
| Noise Generation Limit Angle (°) in Pouring Water | 2.3 | 2.4 | 2.5 | 2.4 | 2.5 | 2.3 | 2.4 | 2.3 | 2.0 | 2.1 |
| TS Friction Coefficient (DRY) | 0.91 | 0.86 | 0.72 | 0.86 | 0.84 | 0.84 | 0.92 | 1.01 | 1.24 | 0.89 |
| TS Friction Coefficient (WET) | 0.64 | 0.63 | 0.63 | 0.63 | 0.62 | 0.60 | 0.66 | 0.70 | 0.86 | 0.51 |
| High-Temperature Low-Tension Bending Fatigue Test (h) | 400 or more | 400 or more | 400 or more | 400 or more | 400 or more | 400 or more | 400 or more | 400 or more | 400 or more | 400 or more |

As obvious from Table 1, Comparative Example 1 did not contain a surfactant, and therefore the dispersibility of the short fibers lowered and tan δ increased, and the power transmission loss was thereby increased. Comparative Example 2 corresponding to Patent Document 2 contained a surfactant but did not contain cotton short fibers, and therefore tan δ lowered and the power transmission loss also lowered, but the noise generation resistance lowered since it did not have a water film-removing effect.

As opposed to these, in Examples 1 to 5, the power transmission loss (tan δ) at 40° C. was less than 0.150, the contact angle was less than 70°, the power transmission loss was less than 0.38, the noise generation limit angle in pouring water was 2.3° or more, the TS friction coefficient in dry was less than 0.95, the TS friction coefficient in pouring water was less than 0.65, and the running time in the high-temperature low-tension bending fatigue test was 400 hours. In these, frictional power transmission belts satisfying both quietness (silentness) and fuel efficiency and having high durability were obtained. In particular, from comparison between Comparative Examples 1 and 2 and Example 2, it is known that the combined use of short fibers of water-absorbing fibers and a surfactant noticeably reduces the power transmission loss (tan δ) and the contact angle with water.

Further, the results in Examples 6 to 8 in which the proportion of the water-absorbing fibers (cotton short fibers) in Example 2 was varied indicate the following tendencies. That is, when the content of the water-absorbing fibers was small, then the water film-removing effect in pouring water lowered and the quietness and the power transmission performance in pouring water lowered. On the other hand, when the content of the water-absorbing fibers was large, then the internal heat generation fluctuated owing to the dispersion failure of some short fibers therefore increasing the loss tangent (tan δ) at 40° C., and as a result, the power transmission loss increased and the fuel efficiency worsened. Though showing such tendencies, Examples 6 and 7 showed performances on the same level as in Example 2. On the other hand, in Example 8, the content of the short fibers was relatively large and therefore as compared with that in Example 2, tan δ (internal heat generation) increased in some degree and the power transmission loss was large. However, Example 8 was also on a level with no problem in practical use.

The present application is based on Japanese Patent Application No. 2013-015169 filed on Jan. 30, 2013 and Japanese Patent Application No. 2014-000456 filed on Jan. 6, 2014, the contents thereof being hereby incorporated by reference.

INDUSTRIAL APPLICABILITY

The frictional power transmission belt of the present invention is usable as various belts that are required to satisfy power transmission loss and silentness, for example, as belts (variable speed belts) that are used in transmissions capable of realizing stepless gear change during belt running.

DESCRIPTION OF REFERENCE NUMERALS AND SIGNS

1 Tension Member
2 Compressive Layer
3 Ribs
4 Short Fibers
5 Adhesive Layer
6 Extensible Layer

The invention claimed is:

1. A frictional power transmission belt comprising:
an extensible layer to form a belt back surface,
a compressive layer formed on one surface of the extensible layer and having a power transmission surface at least a part of which is configured to contact with pulleys, and
a tension member embedded between the extensible layer and the compressive layer along a belt length direction,
wherein at least the compressive layer is formed of a rubber composition comprising a polymer component, short fibers and a surfactant,
wherein the content of the polymer component in the rubber composition is in a range of 45% to 55% by weight, and the polymer component comprises an ethylene-α-olefin elastomer,
wherein the short fibers comprise at least water-absorbing fibers,
wherein the short fibers and the surfactant exist to be exposed out to a surface of at least a part of the power transmission surface, and the surfactant adheres to a surface of at least a part of the exposed short fibers, and
wherein the mean length of the short fibers is 2 mm to 30 mm.

2. The frictional power transmission belt according to claim 1, wherein the short fibers further comprise reinforcing fibers.

3. The frictional power transmission belt according to claim 2, wherein the water-absorbing fibers comprise cellulosic fibers, the reinforcing fibers comprise at least one type of fibers selected from polyester fibers and polyamide fibers, and the surfactant comprises a nonionic surfactant.

4. The frictional power transmission belt according to claim 2, wherein the short fibers comprise the water-absorbing fibers and the reinforcing fibers in a weight ratio of former/latter of from 10/90 to 50/50.

5. The frictional power transmission belt according to claim 1, wherein the surfactant comprises a polyethylene glycol-type nonionic surfactant having a hydrophile-lipophile-balance (HLB) value of from 8.7 to 17.

6. The frictional power transmission belt according to claim 1, wherein the surfactant is selected from polyoxyethylene $C_{10-26}$ alkyl ethers, alkylphenol-ethylene oxide adducts and polyalcohol $C_{10-26}$ fatty acid ester-ethylene oxide adducts, and has a hydrophile-lipophile-balance (HLB) value of from 9 to 15.

7. The frictional power transmission belt according to claim 1, wherein the surfactant has a melting point of 20° C. or lower and a boiling point of 180° C. or higher.

8. The frictional power transmission belt according to claim 1, wherein, relative to 100 parts by weight of the polymer component in the rubber composition, a proportion of the surfactant is from 0.1 to 12 parts by weight and a proportion of the water-absorbing fibers is from 1 to 20 parts by weight.

9. The frictional power transmission belt according to claim 1, wherein a weight ratio of the short fibers of water-absorbing fibers to the surfactant is, as the former/latter, from 15/1 to 0.8/1.

* * * * *